(No Model.)
R. STONE.
SPREADING CART.
No. 559,150. Patented Apr. 28, 1896.
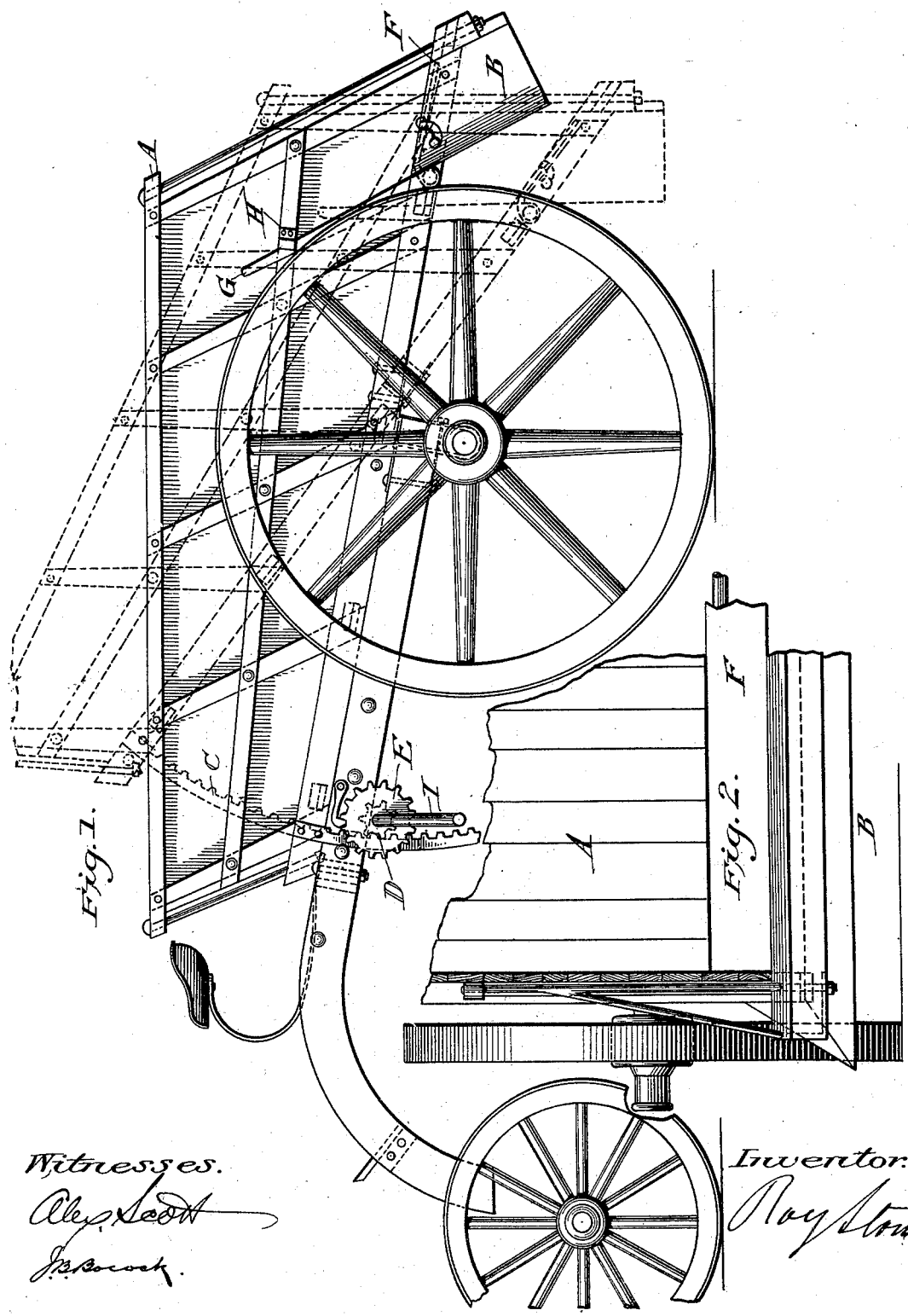

UNITED STATES PATENT OFFICE.

ROY STONE, OF WASHINGTON, DISTRICT OF COLUMBIA.

SPREADING-CART.

SPECIFICATION forming part of Letters Patent No. 559,150, dated April 28, 1896.

Application filed April 19, 1894. Serial No. 508,237. (No model.)

*To all whom it may concern:*

Be it known that I, ROY STONE, a citizen of the United States, residing at Washington, District of Columbia, have invented a new and useful Spreading-Cart for Distributing Gravel, Broken Stone, or like Materials on Roads or Elsewhere, of which the following is a specification.

The object of my invention is to secure the automatic spreading of road materials with exactness and at any desired depth. This has been attempted by regulating the size of the aperture of discharge and the speed of travel while discharging. My invention accomplishes the result independently of these means. The material is discharged vertically through a horizontal aperture, which is closed by a gate until it is lowered to the exact distance from the ground required for the depth of the deposit, when it is held rigid. The gate is then opened and the load slides down till it rests in part upon the ground. Then the cart moves forward and the load is paid out in a bed of uniform depth and width. The aperture may be lowered either by lowering the cart-body entire, or by projecting a mouthpiece downward, or by tilting the body. I prefer the last method, and that only is described. The material is deposited, preferably, behind the wheels, and by means of flaring the discharge-mouth it is spread wider than their tread, so that they do not travel over it either in laying a single bed or another alongside.

In the accompanying drawings, Figure 1 is a side view of the cart, the dotted lines showing the body tilted backward. Fig. 2 is a partial rear-end view.

Similar letters refer to similar parts in both views.

The cart-body A is provided with a flaring discharge-mouth B at the rear end of the bottom, closed by a gate F inside.

To spread the load, the body is tilted backward till this mouth is substantially horizontal and at a proper distance from the ground, where it is rigidly held. The gate is then opened and the load pays out as the cart moves ahead.

The gate, when opened, may form the front lip of the mouth. The rear lip is faced with iron. The flaring ends of the mouth permit the material to spread to a given distance beyond the wheels. The body is tilted by means of the rack C and the pinion D, actuated by the crank I, or by equivalent devices, respectively, and it is held by the pawl E or its equivalent.

What I claim, and desire to secure by Letters Patent, is—

1. A spreading cart or wagon having a discharge-mouth which may be placed and held at any desired distance from the ground, to regulate depth of the deposit.

2. A spreading cart or wagon having a flaring discharge-mouth behind the wheels, by means of which the load is spread to a given distance beyond their tread.

3. A spreading-cart with a discharge-mouth which is lowered and made substantially horizontal by tilting the body, and has mechanism for holding it rigid at the proper distance from the ground to give the required depth of deposit.

ROY STONE.

Witnesses:
CHAS. W. IRISH,
ROBERT B. GRUBBS.